E. GROVE.
WATER HEATING SYSTEM.
APPLICATION FILED MAR. 13, 1918.
1,282,072.
Patented Oct. 22, 1918.
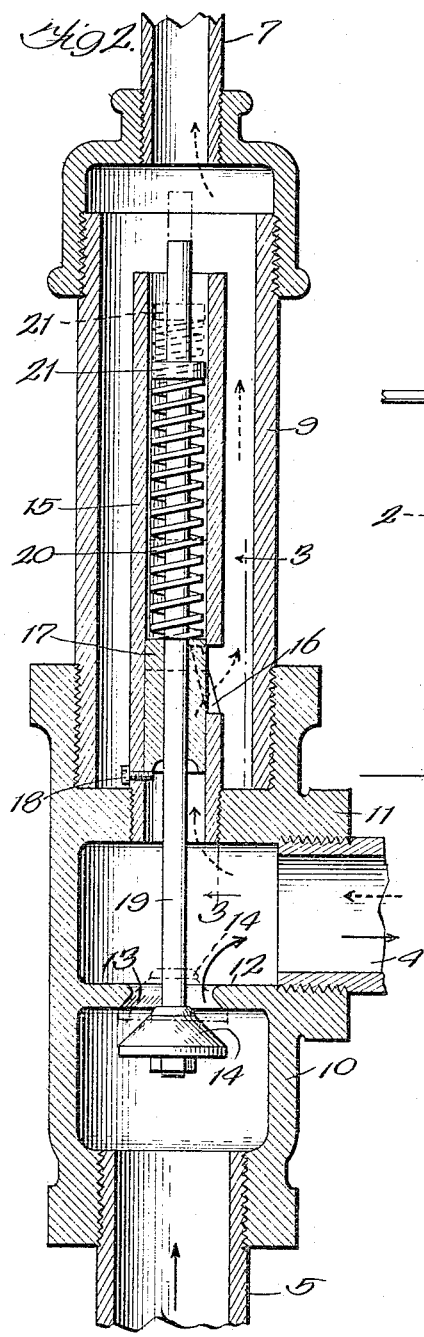
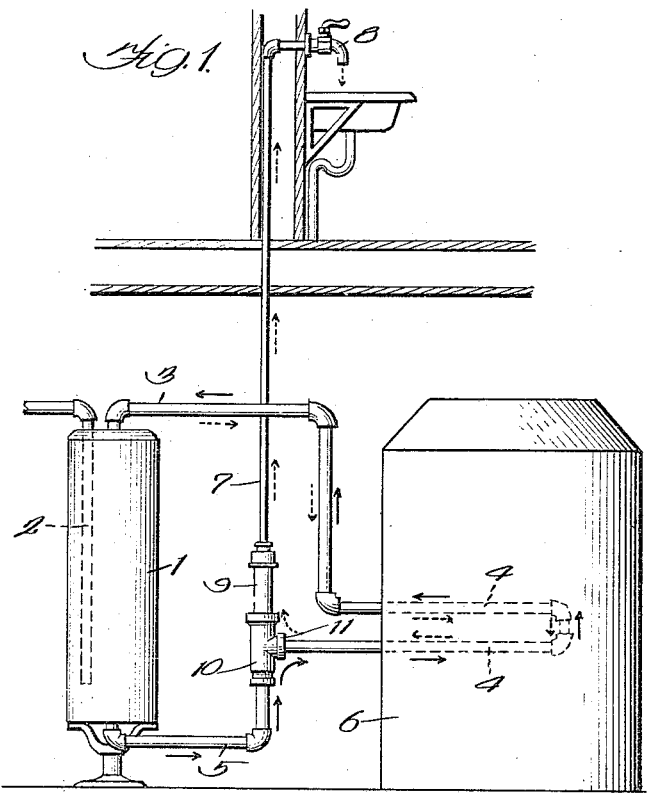
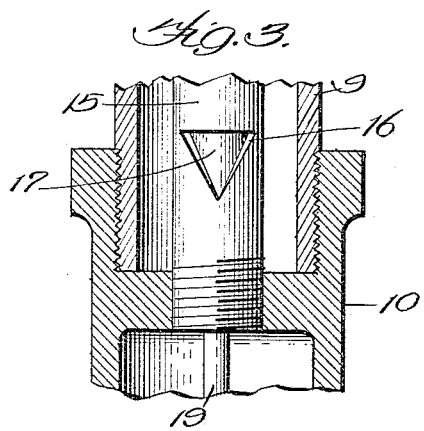
Inventor:
Eugene Grove.
By G. L. Grigg
Atty.

UNITED STATES PATENT OFFICE.

EUGENE GROVE, OF WEST LAFAYETTE, INDIANA.

WATER-HEATING SYSTEM.

1,282,072.                Specification of Letters Patent.      Patented Oct. 22, 1918.

Application filed March 13, 1918.   Serial No. 222,091.

*To all whom it may concern:*

Be it known that I, EUGENE GROVE, a citizen of the United States, residing at West Lafayette, in the county of Tippecanoe and State of Indiana, have invented a certain new and useful Improvement in Water-Heating Systems, of which the following is a full, clear, concise, and exact description.

My invention relates to water heating and supply systems employing supply tanks, piping serially connected with said tanks for the circulation of the water that is to be heated, and means (such as the combustion space of a furnace) upon the exterior of the piping for heating a portion thereof.

One result accomplished by the invention is the prevention of the accumulation of precipitates, such as lime, in the piping or the removal of such precipitates in the event of their collection in the piping. I am also enabled to secure a more direct flow of water from the heated portion of the piping through the outlet piping that branches from the aforesaid piping.

All of the objects and advantages of the system of my invention are realized by providing a valve in the first aforesaid piping, between the place of connection of the outlet piping therewith and the normal outlet end of the supply tank whereby the flow of water through the first aforesaid piping may be reversed when water flows through the outlet piping, and another valve coupled with the aforesaid valve and normally obstructing the flow of water to the outlet piping and actuatable by water flowing to the outlet piping to permit passage of water to this piping and to close the first aforesaid valve.

I will explain my invention more fully by reference to the accompanying drawing showing the preferred embodiment thereof and in which Figure 1 is a view, somewhat diagrammatic, illustrating the system of my invention; Fig. 2 is a longitudinal sectional view of parts of the water heating and outlet piping and the associate valving mechanism; and Fig. 3 is a view on line 3—3 of Fig. 2.

Like parts are indicated by similar characters of reference throughout the different figures.

The upright supply tank 1 is closed at its ends except where pipes pertaining thereto have communication therewith. The piping 2 extends into the tank 1 and terminates near the bottom thereof, water under city pressure or otherwise supplied flowing through the piping 2 into the tank 1. As the piping 2 terminates near the bottom of the tank 1 the cold water initially finds access to the tank near the bottom thereof. Piping 3, 4, 5 is serially connected with the tank, the section 5 of this piping communicating with the bottom of the tank to receive the cold water while the section 3 of the tank communicates with the top of the tank to discharge the heated water into the tank, the portion 4 of the piping being heated by some heating means upon the exterior of the piping such, for example, as the fuel combustion space in a furnace 6. When no water is being drawn from the system the water in the piping 3, 4, 5 flows in the direction indicated by the arrows shown by full lines, the cold water then always passing from the lower or normal outlet end of the tank 1 while the heated water flows into the upper or normal inlet end of the tank. The outlet piping 7 branches from the piping 3, 4, 5 at a place between the normal outlet of the tank and the heating means 6, this piping 7 being provided with a faucet or other valve 8 for controlling the discharge of water from the piping 7. The fitting whereby the pipe sections 4, 5 and the piping 7 are coupled is in the nature of a valve chamber 9 whose upper part constitutes a part of the piping 7, whose lower end portion 10 constitutes a part of the pipe section 5 and whose intermediate portion 11 constitutes a part of the pipe section 4, all of these pipe portions being thrown into communication or being adapted to be thrown into communication by means of the valve chamber 9 and the valving mechanism disposed in this chamber. A wall 12 is provided in the valve chamber 10 below the pipe section 4. This wall 12 is provided with a valve opening 13 which may be closed by a valve 14. The valve 14 is normally open, that is, this valve is open when no water is flowing through the outlet piping 7, whereby the water normally flows through the circulating system in the direction indicated by the arrows shown in full lines. When water is permitted to flow through the faucet or valve 8 the valve 14 is closed, preferably by the mechanism illustrated and soon to be described, whereby the section 5 of the piping is closed to prevent the flow of cold water from the lower or normal outlet end of the tank 1, one result being that the cold water cannot find passage from the lower end of the tank to the outlet piping. Another result which ensues is the reversal of the direction of flow of water through the pipe sections 3, 4 whereby lime or other precipitate in these piping sections is prevented from accumulating or is washed away in the event of its accumulation. Moreover the water which is supplied to the outlet piping is taken directly from the pipe section 4 just after it has been heated to the highest degree possible by the heating means 6. It will be observed that the water which is being supplied to the pipe section 4 when water is flowing through the outlet piping 7, is taken from the upper end of the tank 1 where the water in this tank is hottest whereby the water which flows through the outlet piping is heated to a higher degree than if the water passing to the pipe section 4 were taken from the lower end of the tank 1 where the water is coolest. The direction in which the water flows from the top of the tank through the piping 3, 4 and 7 is indicated by the dotted arrows.

In the preferred embodiment of the invention the valve 14 is automatically operated, the mechanism for effecting the automatic operation of this valve being preferably that which is illustrated in detail in Fig. 2. A sub-valve chamber 15 has its lower end in constant communication with the bore of the main valve chamber 10 and the lower branch of the pipe section 4 where this lower branch is assembled with said main valve chamber. A valve opening 16 is provided in a side of the sub-valve chamber 15. A valve 17 normally closes the valve opening 16 whereby there is normally no communication between the outlet piping 7 and the water circulating piping 3, 4, 5. The valve 17 normally rests upon a screw or pin 18 but when the valve 8 is opened the valve 17 will rise from its support 18 to open the valve passage 16 to permit water to flow through the outlet pipe 7. The valve 17 preferably surrounds the stem 19 of the valve 14 and is movable along said stem. When the valve 17 rises it presses upon the spring 20 which is connected at its upper end with the valve stem 19 through the intermediation of the collar 21 fixed upon said valve stem. By this construction, when the valve 17 is raised the valve stem 19 will be raised through the intermediation of the spring 20 whereby the valve 14 will be closed, the closed position of this valve being indicated by dotted lines in Fig. 2. Whenever the valve in the faucet 8 is open the water will be first effective to raise the valve 17 first to close the valve 14 and thereafter to open the valve passage 16, the valve 17 having sufficient lap to permit the valve 14 to be closed before the valve 17 is opened whereby water cannot be discharged through the outlet piping 7 before its passage through the pipe section 5 is prevented. This result is due to the yielding connection 20 between the valve 17 and the valve 14.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A water heating and supply system including a supply tank; means for supplying water that is to be heated to said tank; piping serially connected with said tank for the circulation of water; means upon the exterior of said piping for heating a portion thereof; outlet piping branching from the aforesaid piping at a place between the normal outlet of the tank and the heating means and provided with a valve for controlling the discharge of water therefrom; a valve in the first aforesaid piping between the place of connection of the outlet piping therewith and the normal outlet end of said tank; and a third valve coupled with the second valve and normally obstructing flow of water to the outlet piping and actuatable by water flowing to the outlet piping to permit passage of water to this piping and to close the second valve, whereby the flow of water through the first aforesaid piping may be reversed when water flows through the outlet piping.

2. A water heating and supply system including a supply tank; means for supplying water that is to be heated to said tank; piping serially connected with said tank for the circulation of water; means upon the exterior of said piping for heating a portion thereof; outlet piping branching from the aforesaid piping at a place between the tank and the heating means and provided with a valve for controlling the discharge of water therefrom; a valve in the first aforesaid piping between the place of connection of the outlet piping therewith and one end of said tank; and a third valve coupled with the second valve and normally obstructing flow of water to the outlet piping and actuatable by water flowing to the outlet piping to permit passage of water to this piping and to close the second valve.

3. A water heating and supply system including a supply tank; means for supplying water that is to be heated to said tank; piping serially connected with said tank for the circulation of water; means upon the exterior of said piping for heating a portion thereof; outlet piping branching from the aforesaid piping at a place between the normal outlet of the tank and the heating means and provided with a valve for controlling the discharge of water therefrom; a valve in the first aforesaid piping between the place of connection of the outlet piping therewith and the normal outlet end of said tank; and a third valve coupled with the second valve and normally obstructing flow of water to the outlet piping and actuatable by water flowing to the outlet piping to permit passage of water to this piping and to close the second valve, whereby the flow of water through the first aforesaid piping may be reversed when water flows through the outlet piping, the connection between the third and second valves being yielding to permit the second valve to be closed before the third valve is opened.

4. A water heating and supply system including a supply tank; means for supplying water that is to be heated to said tank; piping serially connected with said tank for the circulation of water; means upon the exterior of said piping for heating a portion thereof; outlet piping branching from the aforesaid piping at a place between the tank and the heating means and provided with a valve for controlling the discharge of water therefrom; a valve in the first aforesaid piping between the place of connection of the outlet piping therewith and one end of said tank; and a third valve coupled with the second valve and normally obstructing flow of water to the outlet piping and actuatable by water flowing to the outlet piping to permit passage of water to this piping and to close the second valve, the connection between the third and second valves being yielding to permit the second valve to be closed before the third valve is opened.

In witness whereof, I have hereunto subscribed my name this 4th day of March A. D., 1918.

EUGENE GROVE.

Copies of this patent may be obtained for five cents each, by addressing the "Commissioner of Patents, Washington, D. C."